US008584205B2

(12) United States Patent
Lawrence et al.

(10) Patent No.: US 8,584,205 B2
(45) Date of Patent: Nov. 12, 2013

(54) GUARD SPOT BEAMS TO DETER SATELLITE-BASED AUTHENTICATION SYSTEM SPOOFING

(75) Inventors: David G. Lawrence, Santa Clara, CA (US); Gregory M. Gutt, Ashburn, VA (US); David A. Whelan, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 239 days.

(21) Appl. No.: 13/073,830

(22) Filed: Mar. 28, 2011

(65) Prior Publication Data

US 2013/0014216 A1 Jan. 10, 2013

(51) Int. Cl.
G06F 21/00 (2013.01)
(52) U.S. Cl.
USPC .............................................. 726/3; 370/310
(58) Field of Classification Search
USPC .............................................. 726/3; 370/310
See application file for complete search history.

(56) References Cited

U.S. PATENT DOCUMENTS

| | | | | |
|---|---|---|---|---|
| 5,151,782 A * | 9/1992 | Ferraro | ........................... | 725/66 |
| 5,377,225 A * | 12/1994 | Davis | ........................... | 370/342 |
| 5,552,795 A | 9/1996 | Tayloe et al. | | |
| 5,757,916 A | 5/1998 | MacDoran et al. | | |
| 6,208,626 B1 * | 3/2001 | Brewer | ........................... | 370/324 |
| 6,898,628 B2 * | 5/2005 | Bade et al. | ........................... | 709/217 |
| 7,042,392 B2 | 5/2006 | Whelan et al. | | |
| 7,184,750 B2 * | 2/2007 | Tervo et al. | ........................... | 455/410 |
| 7,372,400 B2 | 5/2008 | Cohen et al. | | |
| 7,428,403 B2 * | 9/2008 | Ramaswamy et al. | ....... | 455/3.01 |
| 7,468,696 B2 | 12/2008 | Bornholdt | | |
| 7,489,926 B2 | 2/2009 | Whelan et al. | | |
| 7,554,481 B2 | 6/2009 | Cohen et al. | | |
| 7,579,986 B2 | 8/2009 | DiEsposti | | |
| 7,579,987 B2 | 8/2009 | Cohen et al. | | |
| 7,583,225 B2 | 9/2009 | Cohen et al. | | |
| 7,619,559 B2 | 11/2009 | DiEsposti | | |
| 7,688,261 B2 | 3/2010 | DiEsposti | | |
| 8,179,311 B2 * | 5/2012 | Ghinamo et al. | ........ | 342/357.63 |
| 2005/0159891 A1 | 7/2005 | Cohen et al. | | |
| 2008/0059059 A1 | 3/2008 | Cohen et al. | | |

(Continued)

OTHER PUBLICATIONS

James E. Gilley, Transcrypt_Digital_Phase_Modulation.pdf,Aug. 7, 2003,Transcrypt International, Inc.*

(Continued)

Primary Examiner — Saleh Najjar
Assistant Examiner — Shu Chun Gao
(74) Attorney, Agent, or Firm — Vista IP Law Group LLP; Cynthia A. Dixon (57) ABSTRACT

A transmission-based authentication system and method to prevent an unauthorized claimant from tracking a signal are disclosed herein. In one or more embodiments, the method involves transmitting, from at least one transmission source, a plurality of authentication signals. The method further involves receiving, from at least one receiving source, a resultant signal that includes at least two of the authentication signals. Further, the method involves authenticating, with at least one authenticator device, at least one claimant by comparing properties of the resultant signal the claimant receives from the receiving source location(s) to expected properties of the resultant signal that the claimant should receive from the receiving source location(s). The properties that are compared are signal power, doppler shift, time of reception, and/or signal modulation. The transmission source(s) is employed in at least one satellite and/or at least one pseudo-satellite.

20 Claims, 7 Drawing Sheets

(56) References Cited

U.S. PATENT DOCUMENTS

| | | |
|---|---|---|
| 2008/0143605 A1 | 6/2008 | Bornholdt |
| 2008/0146246 A1 | 6/2008 | Bornholdt |
| 2008/0268838 A1* | 10/2008 | Zufall et al. .................. 455/430 |
| 2009/0025036 A1* | 1/2009 | White et al. .................... 725/49 |
| 2009/0174597 A1 | 7/2009 | DeLellio et al. |
| 2009/0228210 A1 | 9/2009 | Gutt |
| 2009/0288138 A1* | 11/2009 | Kalofonos ......................... 726/2 |
| 2009/0315764 A1 | 12/2009 | Cohen et al. |
| 2009/0315769 A1 | 12/2009 | Whelan et al. |
| 2010/0061317 A1* | 3/2010 | Gorokhov et al. ............ 370/329 |
| 2010/0077483 A1* | 3/2010 | Stolfo et al. .................... 726/24 |
| 2010/0171652 A1 | 7/2010 | Gutt et al. |

OTHER PUBLICATIONS

Rahman et al., TR_OFDM_review.pdf, Feb. 18, 2005,Center for TeleInFrastruktur (CTiF), Aalborg University.*

International Search Report, PCT Application Serial No. PCT/US2012/027034, May 31, 2012.

Denning, et al., "Location-based Authentication: Grounding Cyberspace for Better Security", Computer Fraud and Security, Oxford, GB, Feb. 1, 1996, pp. 12-16, XP002117683, ISSN: 1361-3723, DOI: 10.1016/S1361-3723 (97)82613-9, pp. 12-16, figure 1.

Nguyen, "Pertectionnement de Communications Securisees Agt en Utilisant la Cryptographie Quantique", Jan. 31, 2005, XP55026961, http://www2.ifi.auf.org/rapports/stages-promo08/stage-nguyen_noan_linh_tam.pdf, retrieved on May 11, 2005, sections 2.1.2 and 3.1, figures 1 and 10.

Vilela, et al., "Friendly Jamming for Wireless Secrecy", Communications (ICC), 2010 IEEE International Conference ON, IEEE, Piscataway, NJ, USA, May 23, 2010, pp. 1-6, XP031703483, ISBN: 978-1-4244-6402-9, pp. 1-6, figure 1.

Pang, et al., "Design of a Location-based Authentication System for Satellite TV Systems", Nov. 30, 2008, XP55027348, http://courses.ece.ubc.ca/412/term_project/reports/2008/12.pdf, retrieved on May 15, 2012, pp. 1-4.

* cited by examiner

GUARD SPOT BEAMS TO DETER SATELLITE-BASED AUTHENTICATION SYSTEM SPOOFING

CROSS-REFERENCE TO RELATED APPLICATION

This application is related to U.S. patent application Ser. No. 12/949,404, filed Nov. 18, 2010, which is hereby incorporated by reference in its entirety.

BACKGROUND

The present disclosure relates to guard spot beams. In particular, it relates to guard spot beams to deter satellite-based authentication system spoofing.

SUMMARY

The present disclosure relates to a method, system, and apparatus for using guard spot beams to deter satellite-based authentication system spoofing. In particular, the present disclosure teaches a method for a transmission-based authentication system to prevent an unauthorized claimant from tracking a signal. In one or more embodiments, the disclosed method involves transmitting, from at least one transmission source, an authentication signal and at least one guard signal. The method further involves receiving, from at least one receiving source, at least one resultant signal. At least one resultant signal includes the authentication signal and/or at least one guard signal. In addition, the method further involves authenticating, with at least one authenticator device, at least one claimant by evaluating at least one resultant signal that at least one claimant receives from at least one receiving source. In at least one embodiment, at least one claimant is an entity and/or a user.

In one or more embodiments, the authentication signal and at least one guard signal are transmitted from the same transmission source. In at least one embodiment, the authentication signal and at least one guard signal are transmitted from different transmission sources. In some embodiments, the authentication signal and at least one guard signal are transmitted on the same frequency. In alternative embodiments, the authentication signal and at least one guard signal are transmitted on different frequencies.

In at least one embodiment, data transmitted by at least one guard signal is used for a legitimate purpose. In one or more embodiments, at least one guard signal at least partially includes an authentication signal. In various embodiments, the guard signal may include an authentication signal and/or data, which may be legitimate or false. In some embodiments, data transmitted by at least one guard signal includes localized information and/or regional information. In alternative embodiments, data transmitted by at least one guard signal is false data that is used to detect unauthorized claimants and/or compromised systems. In some embodiments, data transmitted by at least one guard signal is false data that is used to locate unauthorized claimants and/or compromised systems.

In one or more embodiments, data transmitted by the guard signal can be tracked by a legitimate claimant that is located within an overlap area of the signals. In some embodiments, the data is transmitted via at least two out-of-phase binary phase shift keying (BPSK) signals, where the out-of-phase BPSK signals appear to be at least one quadrature phase shift keying (QPSK) signal. In at least one embodiment, a changing of the modulation of the bit stream of at least one guard signal modifies the broadcast power of the bits in the bit stream on a bit by bit basis. In some embodiments, when at least two guard signals are transmitted, a relative power of the guard signals is varied such that the guard signals located closer to the authentication signal have a higher power than the guard signals located further from the authentication signal.

Additionally, the present disclosure teaches a transmission-based authentication system to prevent an unauthorized claimant from tracking a signal. In one or more embodiments, the disclosed system involves at least one transmitter, at least one receiver, and at least one authenticator device. In one or more embodiments, at least one transmitter transmits an authentication signal and at least one guard signal; and at least one receiver receives at least one resultant signal. At least one resultant signal includes the authentication signal and/or at least one guard signal. In at least one embodiment, at least one authenticator device authenticates at least one claimant by evaluating at least one resultant signal that at least one claimant receives from at least one receiver. It should be noted that, in one or more embodiments, the system also includes a cyber locate portal. In these embodiments, the resultant signal is sent to the authenticator device for authentication via the cyber locate portal.

In one or more embodiments, the authentication data is encrypted to avoid being intercepted and re-used by a spoofer. Additionally, the data may be signed with a signature, which can be used to confirm the data originated from a specific portal device by comparing the signature of the data to the signature for that specific portal device. This method, or another similar mechanism, is essential for curtailing various types of cyber attacks.

Each cyber locate portal device may have a unique key for encrypting, and may have an additional key for signing the sample data. These keys would optimally only be known by the authentication server and the portal device. This architecture helps to maintain the safety of the other portal devices because if an unauthorized claimant identifies the keys of one portal device, the remaining portal devices cannot be spoofed by using those keys. As an example of such a safeguard, if a legitimate claimant located inside of a building is using their portal device, a spoofer located immediately outside of the building whom has identified the legitimate claimant's password cannot spoof the system as they are unable to accurately sign the sample data with the legitimate claimant's portal device's signature. Additionally, it should be noted that for the disclosed system, a spoofer that has stolen a claimant's portal device and has identified the claimant's password, but is not located near the claimant's access location, will not be able to have access to the secure network.

In one or more embodiments, at least one claimant is an entity and/or a user. In at least one embodiment, at least one receiver and at least one transmitter are incorporated together in at least one transceiver. In some embodiments, the authentication signal and at least one guard signal are transmitted from the same transmitter. In at least one embodiment, the authentication signal and at least one guard signal are transmitted from different transmitters. In one or more embodiments, at least one authenticator device includes a server and/or a processor. In some embodiments, the authentication signal and at least one guard signal are transmitted on the same frequency.

In at least one embodiment, at least one authenticator device operates at least part of a host network. In one or more embodiments, the disclosed system further comprises a host network that operates as an intermediary between at least one claimant and at least one authenticator device. In some embodiments, at least one receiver is employed in a cell phone, a personal digital assistant (PDA), a personal computer, a computer node, an internet protocol (IP) node, a server, and/or a wi-fi node.

In some embodiments, the claimant interface device (e.g., the receiver) may also encompass the functionality of a cyber locate portal device. In some embodiments, the claimant interface device and the cyber locate portal device are combined in a cell phone or PDA. Note that if a cell phone or PDA includes the cyber locate portal device, the signal processing, encryption, and signature functions may ideally be performed in hardware and/or firmware that are not part of the operating system of the cell phone or PDA, which are susceptible to being attacked by spoofers. For example, optionally, the encryption and signature keys as well as the unencrypted sample data are not accessible by the cell phone or PDA operating system.

In one or more embodiments, at least one transmitter is employed in at least one satellite and/or at least one pseudo-satellite. In some embodiments, at least one satellite is a Lower Earth Orbiting (LEO) satellite, a Medium Earth Orbiting (MEO) satellite, and/or a Geosynchronous Earth Orbiting (GEO) satellite. In one or more embodiments, at least one claimant is stationary and/or mobile. In at least one embodiment, at least one authenticator device is a peer device.

In one or more embodiments, a method for a transmission-based authentication system involves transmitting, from at least one transmission source, a plurality of authentication signals. The method further involves receiving, from at least one receiving source, a resultant signal that includes at least two of the authentication signals. Further, the method involves authenticating, with at least one authenticator device, at least one claimant by comparing properties of the resultant signal the claimant receives from the receiving source location(s) to expected properties of the resultant signal that the claimant should receive from the receiving source location(s).

In one or more embodiments, a system and method for a transmission based authentication system involve transmitting, from at least one transmission source, a plurality of authentication signals in spot beams, where each spot beam contains one authentication signal. In at least one embodiment, the transmission source(s) is employed in at least one LEO satellite from an Iridium satellite constellation. In some embodiments, the authentication signals are transmitted on the same frequency. The method further involves receiving, from at least one receiving source, a resultant signal that includes at least two of the authentication signals. Further, the method involves authenticating at least one claimant by comparing properties of the resultant signal the claimant receives from the receiving source location(s) to expected properties of the resultant signal that the claimant should receive from the receiving source location(s).

In at least one embodiment, the authentication signals are transmitted from the same transmission source. In alternative embodiments, the authentication signals are transmitted from the different transmission sources. In some embodiments, the transmission source(s) is employed by at least one satellite and/or at least one pseudo-satellite. In one or more embodiments, the authentication signals are transmitted on the same frequency and at the same time, and each authentication signal has a different modulation than the other authentication signals. In at least one embodiment, the different modulations are different pseudorandom digital modulation sequences. In some embodiments, the different pseudorandom digital modulation sequences are different BPSK code sequences.

In one or more embodiments, the properties that are compared are signal power, doppler shift, time of reception, and/or signal modulation. In particular, the received signal modulation is the combination of a plurality of authentication signals, and this resultant combined modulation has characteristics that will change with the receiving source's location.

DRAWINGS

These and other features, aspects, and advantages of the present disclosure will become better understood with regard to the following description, appended claims, and accompanying drawings where:

DESCRIPTION

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
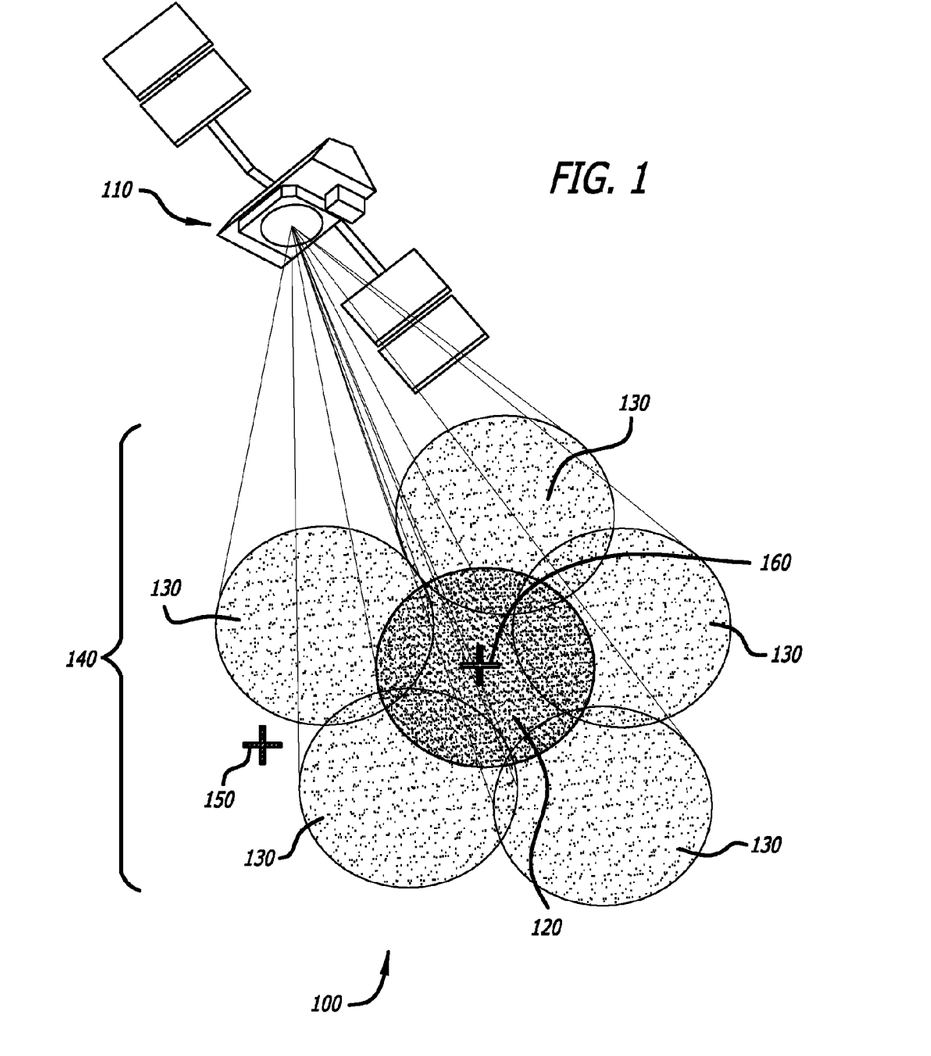
FIG. 1 illustrates an embodiment of a transmission-based authentication system employing a satellite to transmit an authentication beam along with multiple guard beams.

FIG. 1 illustrates an embodiment of a transmission-based authentication system 100 employing a satellite 110 that transmits overlapping spot beams 140 comprising an authentication beam 120, which may also be referred to as "beam zero," along with one or more guard beams 130. An unauthorized claimant 150 attempts to spoof the authentication system 100 in order to achieve access to a secure network by simulating the location of a legitimate, authorized claimant 160. In one or more embodiments, a claimant may be a user or an entity that may be stationary or mobile. In one embodiment, the entity may be a device (e.g., a cell phone, personal device, computer, server, etc.) or system, and a user may be a person or other living or non-living thing.

Each location within the guard beams 130 and beam zero 120 receives unique authentication signals from each beam 140. The locations within the regions where the beams 140 overlap receive composite authentication signals. The unauthorized claimant 150 is not located at the authorized claimant's 160 location and, thus, the unauthorized claimant 150 will not receive the particular authentication signal 120 that is necessary for access to the secure network. Unless a claimant is at a legitimate location that is verifiable by the satellite authentication signals, access to the secure network will be denied.

Figure 2:
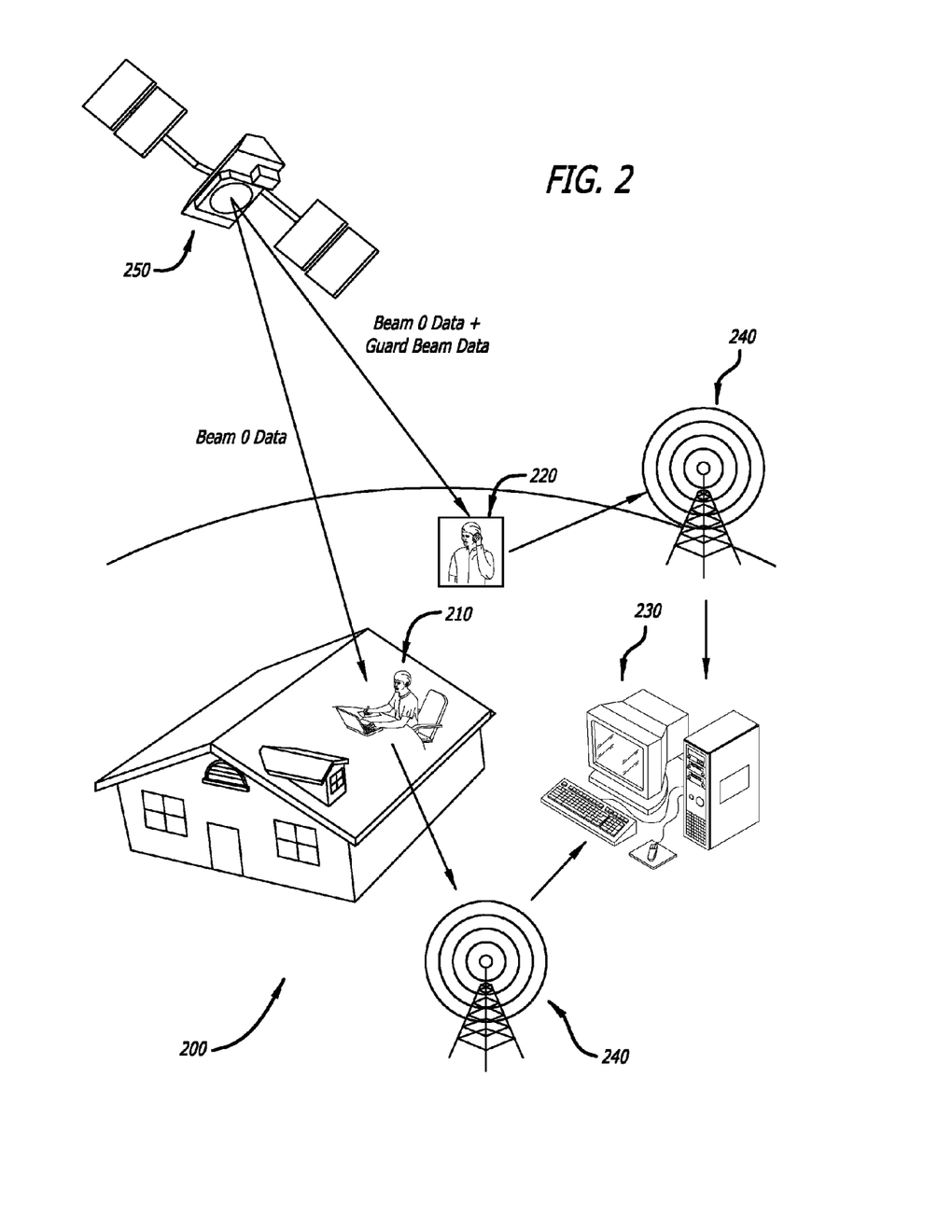
FIG. 2 illustrates an embodiment of a transmission-based authentication system used with an indoor environment.

FIG. 2 illustrates an embodiment of a transmission-based authentication system 200 used with an indoor environment. In one or more embodiments, types of tracking/monitoring systems where the transmission-based authentication system 200 may be employed include, but are not limited to, radio-frequency identification (RFID) systems; smart cards, such as those used for employee security; online banking or other fund/credit monitoring; prisoner tracking; and tracking of sexual offenders under Megan's Law.

As shown in FIG. 2, an authorized claimant 210, who is in an indoor/attenuated environment, gains access to a secure network when an authenticator device 230 verifies that the authorized claimant 210 is located at a legitimate location by using a satellite signal that is unique in both time and location. An unauthorized claimant 220, who attempts to spoof the authentication system 200 by falsely claiming that they are at a legitimate location, is denied access to the network because they cannot provide the correct, unique signal data. The unique signal is a resultant composite signal that is received at a specific location from multiple overlapping beams transmitted by the satellite 250. These overlapping beams cover a region containing an authorized claimant 210. In this figure, the authorized claimant 210 is shown to be indoors where GPS and other location determination signals cannot reach, and the unauthorized claimant 220 is shown to be outside and attempting to spoof the authenticator device 230.

Still referring to FIG. 2, the authorized claimant 210 requests secure network access from the secure network authenticator device 230 through ground-based communication systems 240. This request includes data from the unique time and location signal that the authorized claimant 210 receives from the satellite 250. If the signal data matches the authorized claimant's 210 location, the authenticator device 230 will grant the claimant 210 access to the secure network. As such, the authorized claimant 210, shown in a region illuminated by beam zero, is granted secure network access, while the unauthorized claimant 220, shown in a region illuminated by beam zero and by a guard beam that corrupts the beam zero authorization signal, is denied access.

Figure 3A:
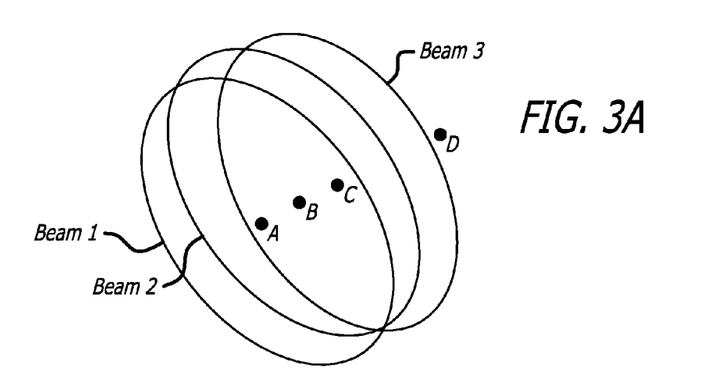
FIG. 3A illustrates an embodiment of a transmission-based authentication system having four claimants located at various positions within and near three overlapping spot beams.

FIGS. 3A through 3F depict an embodiment where the signal received by one or more claimants from multiple overlapping spot beams is used to authenticate the location and identity of one or more claimants. The basic concept is that depending upon where the claimants are located within the overlapping spot beam pattern, each claimant will receive a different composite signal from the combination of signals transmitted from the multiple spot beams. In particular, FIG. 3A shows the disclosed transmission-based authentication system having an exemplary situation of four claimants (i.e., A, B, C, and D) being located at various positions within and near three overlapping spot beams (i.e., Beam 1, Beam 2, and Beam 3). As such, this figure illustrates the overlapping spot beams illuminating the locations of claimants A, B, and C. The location of claimant D is shown to be just outside the beam pattern.

Figure 3B:
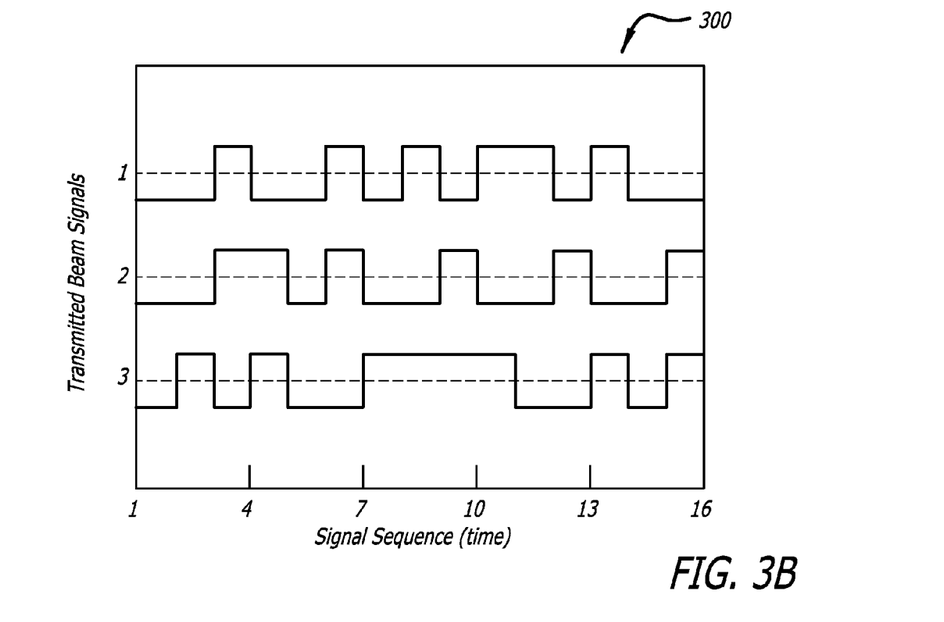
FIG. 3B illustrates an embodiment of a graph of signals transmitted by the three spot beams of FIG. 3A.

FIG. 3B illustrates a graph 300 showing exemplary signals (1, 2, and 3) that are transmitted by the three spot beams of FIG. 3A. In particular, this figure shows an exemplary set of signals that are transmitted by each spot beam (Beam 1, Beam 2, and Beam 3), and are used to authenticate claimants. The three curves (indicated by 1, 2, and 3 on graph 300) show the bit sequence over time for the transmitted signals from each spot beam. These three bit sequences are only used to demonstrate the concept. As such, many other types of signals and forms of modulation may also be employed. The signal pattern may also be changed periodically to provide additional protection from unauthorized claimants and to provide a unique time for when a mobile claimant is at a particular location. In addition, these signals that are used to authenticate a claimant may be sent separate from a normal signal for brief periods during normal transmission or, alternatively, may be embedded within the normal signal.

Figure 3C:
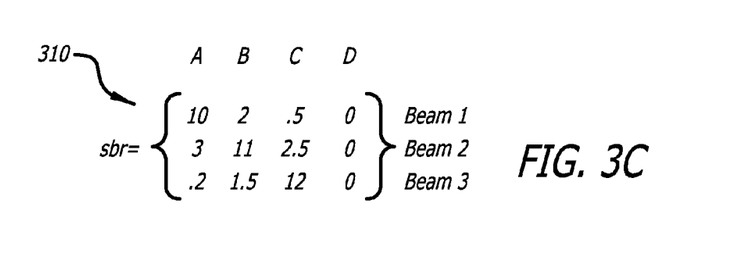
FIG. 3C illustrates an embodiment of an array of signal strengths of the three spot beams at the locations of the four claimants of FIG. 3A.

FIG. 3C shows an array 310 of the signal strengths of the three spot beams (Beam 1, Beam 2, and Beam 3) at the locations of the four claimants (A, B, C, and D) of FIG. 3A. In particular, the signal beam received (sbr) array 310 shows the signal strength received by each claimant (A, B, C, and D) in the array 310 columns from the signal beam received (Beam 1, Beam 2, and Beam 3) in the rows of the array 310. For example, a claimant at location B receives most of the signal from Beam 2, which has a signal strength of 11, compared to signal strengths 2 and 1.5 from Beams 1 and 3, respectively. The characteristics and/or properties of a claimant's received signal is the signature that is used to validate the claimant's location.

Figure 3D:
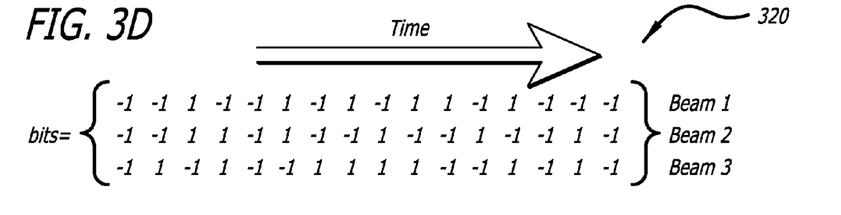
FIG. 3D illustrates an embodiment of an array of bits for the three spot beams of FIG. 3A.

FIG. 3D depicts an array 320 of bits for the three spot beams (Beam 1, Beam 2, and Beam 3) of FIG. 3A. In this figure, the bits array 320 shows the signal sequence transmitted by each beam (Beam 1, Beam 2, and Beam 3) in the three array rows, as a function of time, which is represented by the sixteen (16) columns of the array 320. Here, to illustrate the concept, the transmitted signals are binary. However, in alternate embodiments, other signal patterns may be employed.

Figure 3E:
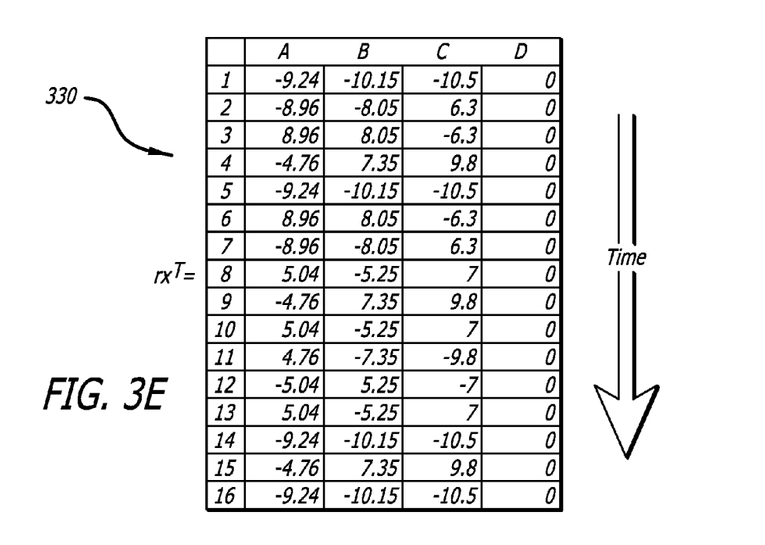
FIG. 3E illustrates an embodiment of an array of resultant signal sequences received by the four claimants of FIG. 3A.

FIG. 3E illustrates an array 330 of the resultant signal sequences that are received by the four claimants (A, B, C, and D) of FIG. 3A. This figure shows the resultant sequence of composite signals received by the claimants at locations A, B, C and D from the multiple overlapping beams. The resultant signal $(rx) = g \times (sbr^T) \times (bits)$, where g equals the gain of each claimant receiver. In this example, gain (g) is chosen to be equal to 0.7 (i.e. g=0.7). The sixteen (16) rows of the received array $(rx^T)$ 330 represent time steps, and the four (4) columns correspond to the different locations (A, B, C and D) of the claimants. It should be noted that, in this example, the claimant at location D receives no signal since this location is outside of the beam pattern.

Figure 3F:
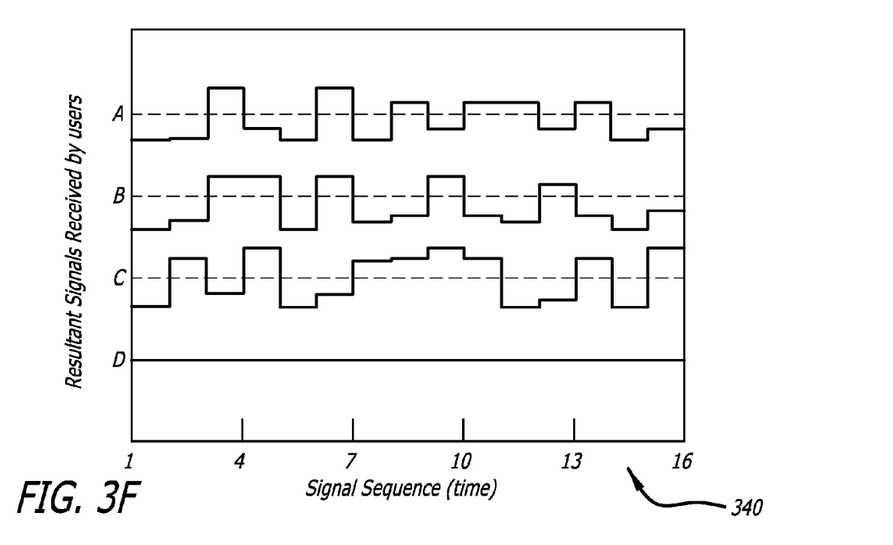
FIG. 3F illustrates an embodiment of a graph depicting resultant signals received by the four claimants of FIG. 3A

FIG. 3F shows a graph 340 depicting the resultant signals that are received by the four claimants (A, B, C, and D) of FIG. 3A. The four curves (indicated by A, B, C, and D) show the time sequence of the resultant signals that are received by claimants at locations A, B, C and D. The four resultant composite signals provide unique claimant location identification for the four claimants (A, B, C, and D), respectively.

Figure 4:
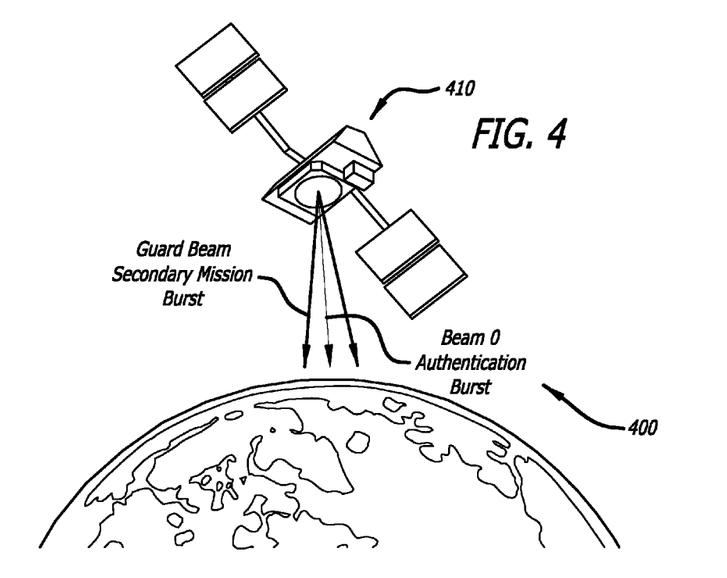
FIG. 4 illustrates an embodiment of a transmission-based authentication system using guard beam transmission as part of a secondary mission.

FIG. 4 illustrates an embodiment of the transmission-based authentication system 400 using guard beam transmission as part of a secondary mission. In this embodiment, at least one guard beam is used to transmit legitimate data as part of a secondary mission for the satellite 410. For example, a guard beam could be used to broadcast regional information, such as differential GPS network corrections that are valid in the guard beam footprint. However, it should be noted that for higher security this is not the preferred embodiment because the regional information is more likely to be able to be determined by a spoofer than a more random signal. As another example, the guard beam could be used to transmit data that is relevant to the primary mission (i.e. the authentication signal) and/or relevant to a secondary mission.

As shown in FIG. 4, the authentication signals may be transmitted in bursts. The authentication signals may be randomly sent in bursts, in beam zero or in alternating beams (including beam zero and guard beams), so that the timing of the authentication signals indicates the location of the claimant. As such, if a claimant receives multiple bursts, then the claimant is located within beam zero or within a beam overlapping region.

In alternative embodiments, the authentication signals may be embedded in the normal data transmission in order to minimize their impact on satellite transmission power and/or bandwidth. The authentication signals may be embedded in the data transmission by various ways (e.g., time, frequency, polarization shifts, etc.) that do not impact normal reception, but are detectable by special processing.

In one or more embodiments, the authentication signals may be embedded in normal data transmission by varying broadcast power on a bit-by-bit basis. For these embodiments, the guard beam bit modulation changes the broadcast power of the transmitted bits on a bit-by-bit basis. This prevents a spoofer from attempting to observe the bits in their local guard beam, and processing the data to remove them.

For example, a spoofer makes a series of measurements (m):

95 105 105 −105 105 −105 95 −105 −95 −95

The spoofer might guess that the guard signal (g) was sign(m):

1 1 1 −1 1 −1 1 −1 −1 −1

And, the signal the spoofer is trying to access is sign(m−sign(m)*100):

−1 1 1 −1 1 −1 −1 −1 1 1

If instead of a fixed power signal, the guard beam broadcast power was modulated such that its component of the received signal was:

107 97 91 −93 99 −91 93 −107 −107 −101

Then, the signal the spoofer would receive would be:

102 102 96 −98 104 −96 88 −112 −102 −96

It would be much more difficult for the spoofer to try to figure out the authentication signal from that set of measurements.

In addition, it should be noted that an extension of that same idea would be to add a small random quadrature phase shift keying (QPSK) signal onto the guard band signal. For this case, the guard signal could still be used to transmit useful information.

Figure 5:
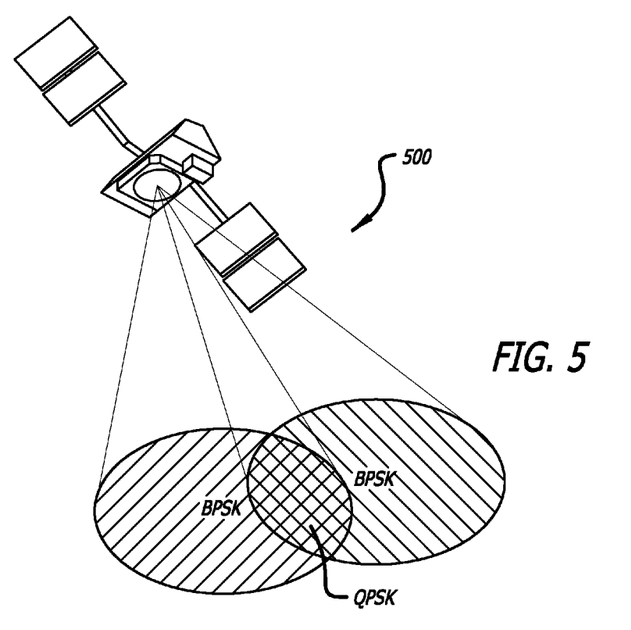
FIG. 5 illustrates an embodiment of a transmission-based authentication system employing out-of-phase binary phase shift keying (BPSK) guard beam transmission.

FIG. 5 shows the transmission-based authentication system 500 employing out-of-phase binary phase shift keying (BPSK) guard beam transmission. Specifically, in this figure, the guard beams transmit the authentication signal using out-of-phase BPSK signals between adjacent overlapping beams. The signal in the overlap region will then be a QPSK signal. The unique location of a claimant within a beam can then be determined by analyzing the signal phasing and signal type that the claimant receives.

Figure 6:
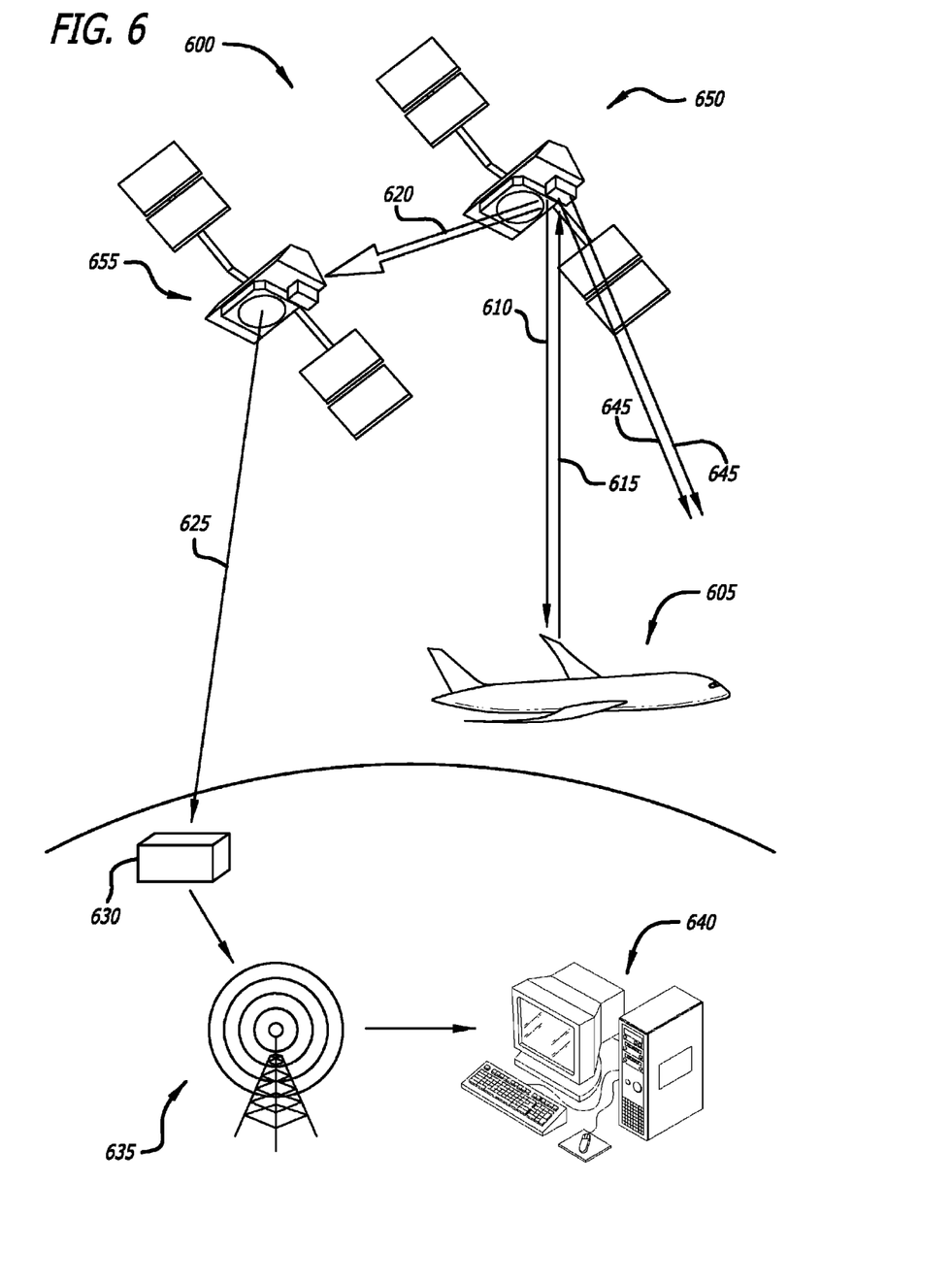
FIG. 6 illustrates an embodiment of a transmission-based authentication system having an air-based claimant.

In general, the authentication operations may include mobile claimants and/or stationary claimants (i.e. claimants at fixed locations) which utilize unique time and location signals provided by the guard beams to acquire access to a secure network. FIG. 6 illustrates an embodiment of a transmission-based authentication system 600 having a mobile, air-based claimant 605. For these embodiments, one or more satellites may be used to transmit time-varying authentication signals from overlapping beams that cover both fixed and mobile ground, sea, and air claimants. In some embodiments, the system will periodically change the guard beam authentication signals in an effort to further minimize the potential for spoofing. The guard beams, ideally, would be continuously changed randomly and/or changed in some other random way to suit a secondary mission, such as a mission for performing local GPS corrections.

As shown in FIG. 6, a satellite 650 may transmit a beam zero authentication signal 610 as well as guard beams 645. The mobile, air-based claimant 605, which is depicted as an aircraft, requests secure network access by sending authentication data, which may be obtained from time and spatially varying overlapping guard beams, though a satellite communication up-link 615. The satellite 650 transmits the authentication request via a cross-link 620 to another satellite 655. The satellite 655 may then transmit the request via a down-link 625 to a satellite communication terminal 630. The satellite communication terminal 630 passes the request through a land-based communication system 635 to a ground-based authenticator device 640. If the mobile claimant 605 is at a legitimate location at the appropriate time, the claimant 605 may be granted secure network access. In this embodiment, the secure network link 615 to the aircraft 605 is shown via a satellite 650, but in other embodiments alternate mobile secure links may be employed. In some embodiments, the secure network accesses may be granted to claimants for only limited amounts of time before the claimants are required to be recertified. These embodiments pertain especially to mobile claimants.

In alternative embodiments, a secondary signal source may be used to provide additional shielding transmissions. For example, a second satellite could broadcast guard beams for the outside beams of a first satellite.

Figure 7:
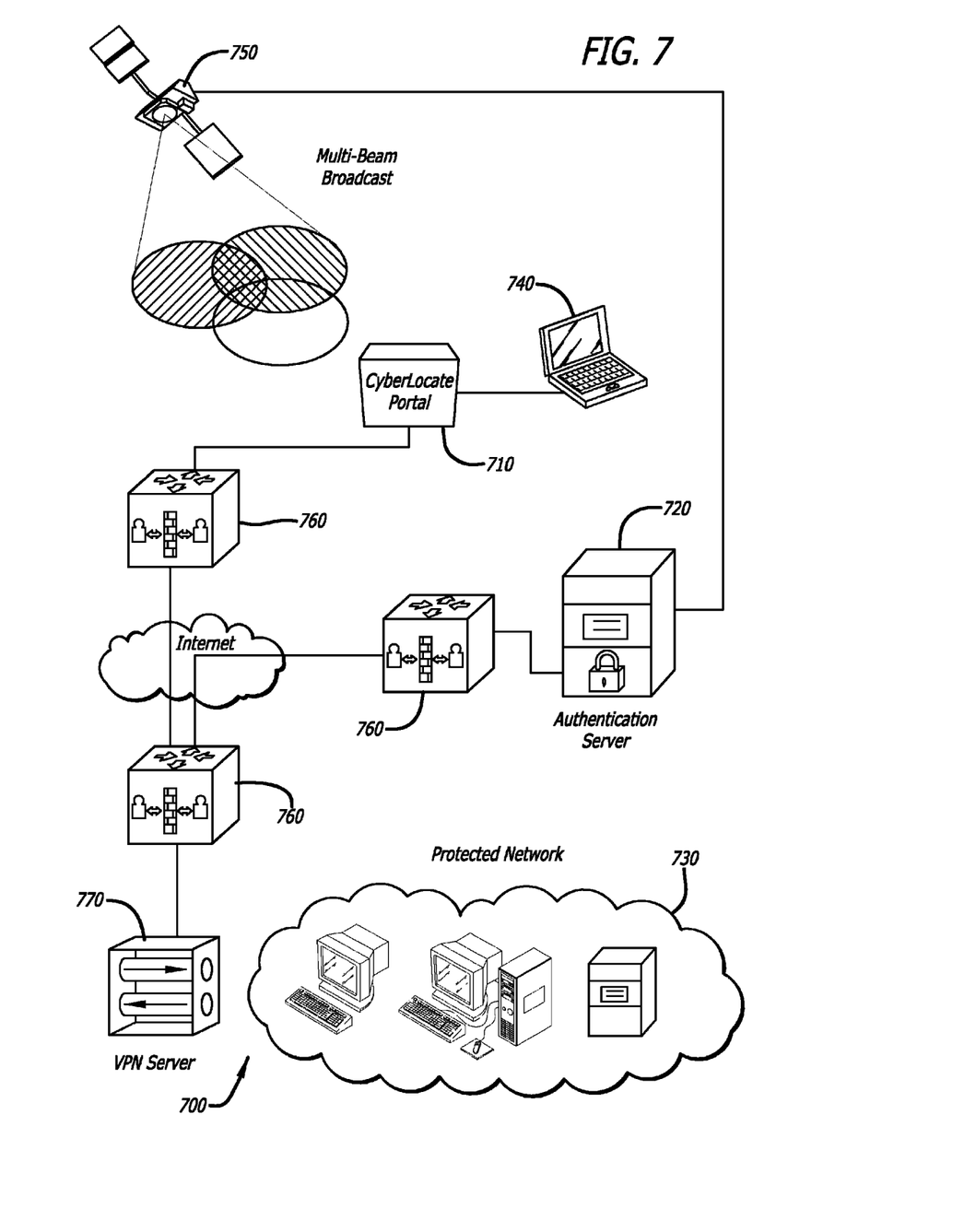
FIG. 7 illustrates an embodiment of a transmission-based authentication system employing a cyber locate portal in conjunction with an authentication server.

FIG. 7 illustrates an embodiment of a transmission-based authentication system 700 employing a cyber locate portal 710 in conjunction with an authentication server 720. In this figure, an authorized user wishes to log into the secure protected network 730 via the user's laptop computer 740. The user, depending upon the user's location, will receive a unique authentication signal that is being transmitted by the satellite 750.

The laptop computer 740 will access the internet via the cyber locate portal 710 device. In order to do this, the laptop computer 740 may optionally netboot via the cyber locate portal 710 device. After the laptop computer 740 has performed the netboot, the laptop computer 740 will be operating on the cyber locate portal 710 device's operating system (OS). By operating on the cyber locate portal 710 device's operating system, the laptop computer 740 is utilizing a more secure operating system because the cyber locate portal 710 device's operating system has much smaller chance of having a virus than the laptop computer's 740 operating system. This is because the laptop computer 740 is frequently used by the claimant to access the internet and open email attachments and, thus, is generally more vulnerable to cyber and/or network attacks.

The laptop computer 740 will then send the unique authentication signal information across secure internet links 760 through the cyber locate portal 710 to the authentication server 720.

Once the authentication server 720 receives the unique authentication signal information, the authentication server 720 will process the information in order to verify if the user is authorized. After the authentication server 720 verifies that the user is authorized, the authentication server 720 will send an authorization message to the secure protected network 740 across secure internet links 760. Once the secure protected network 740 receives the authorization message, the secure protected network 740 will allow the user to access it. In one or more embodiments, the secure protected network is 730 connected to the internet via a virtual private network (VPN) server 770.

The methods and apparatus herein provide an operative system for guard spot beams. Specifically, this system relates to guard spot beams to deter satellite-based authentication system spoofing. The systems and methods teach a transmission-based authentication system that may used to prevent an unauthorized claimant from tracking a signal that is intended for a legitimate, authorized claimant. A claimant may be an entity or a user that is either mobile or stationary. In one or more embodiments, the systems and methods employ a plurality of "guard beams" to prevent the tracking of a signal in a single spot beam "beam zero" by an unauthorized claimant. In at least one embodiment, the guard beams send legitimate transmissions to authorized claimants. These transmissions may contain localized information or regional information. In other embodiments, the guard beams may transmit false data that may be used to detect and locate unauthorized claimants and compromised systems.

In particular, the systems and methods teach a transmission based authentication system that may be capable of using at least two transmitted spot beams to authenticate a claimant. The data transmitted in the spot beams may include an authentication key and/or other pseudo-random code segment that may be used to distinguish data in one of the beams from data in the other beams. The systems and methods may use other distinguishing beam characteristics and/or data characteristics to distinguish the data between the beams. In addition, the systems and methods may be employed in an indoor environment. The systems and methods may additionally employ the use of biometrics to authenticate an authorized claimant in order to improve the overall security of the system.

In one or more embodiments, the systems and methods may be utilized for various types of network security and/or cyber security applications. In some embodiments, the systems and methods relate to network security for networks including, but not limited to, self-forming, peer-to-peer, and/or ad hoc networks. In addition, the systems and methods may be used to restrict access to a networked system.

The authentication system includes at least three aspects. One aspect of the authentication system is that it restricts unauthorized claimants from accessing a secure network or resource. One way unauthorized claimants attempt to gain access to a secure network or resource is through spoofing an authenticator device into identifying them as an authorized claimant. With the addition of at least one "guard beam", which provides at least one additional signal that the unauthorized claimant will to have to decode, the unauthorized claimant's ability to access the primary signal may be much more difficult. This is because it may be more difficult for the unauthorized claimant to extract a signal from a mixed signal than to extract a signal from only noise. Thus, each additional guard beam added around the perimeter of beam zero increases the difficulty in spoofing.

In one or more embodiments, the guard beams may be transmitted at a higher power than beam zero is transmitted. This will cause the signals from the guard beams to shield the beam zero authentication signal by making it difficult for an unauthorized claimant to decode the primary signal in beam zero. This in effect is essentially jamming (i.e., the phenomena that occurs when different data transmitted on the same frequency interferes with each other at the receiver) the unauthorized claimant's receiver by masking the beam zero authentication signal. In addition, it should be noted that since the unauthorized claimant may be located outside of the perimeter of the beam zero authentication beam, the shielding guard beams may be closer in terms of distance to the unauthorized claimant than the beam zero authentication beam. As such, the shielding guard beams may have a higher signal strength at the unauthorized claimant's receiver than the beam zero authentication beam. As such, the higher signal strengths of the guard beams may help to shield the beam zero authentication signal from the unauthorized claimant's receiver.

A second aspect of the authentication system is that only a single signal transmission source may be required. This may be the case, for example, if the disclosed system employs an Iridium Low Earth Orbit (LEO) satellite constellation, where each of the satellites in the constellation has an antenna geometry that transmits forty-eight (48) spot beams with a distinctive spot beam pattern. An authenticator device can authenticate an authorized entity, user, and/or message by determining that the claimant is located within the correct spot beam. Alternatively, the authenticator device can authenticate an authorized entity, user, and/or message by determining that the claimant is located within the correct spot beam at the correct time. The beam geometry of the satellites in this particular constellation allows for the previously discussed spoofing deterrent to take place when employing only one of these satellites to transmit at least two beams. It should be noted that in alternative embodiments, the system may employ more than one signal transmission source.

In one or more embodiments, when the authentication system employs the Iridium satellite constellation, at least one of the satellites may be used to transmit at least one high power signal, which may include a unique pseudorandom noise (PRN) code segment (i.e., an authentication key). An authorized claimant on the ground may record this signal, which includes the beam specific authentication key, and then transmit the recorded signal to an authenticator device (e.g., via a terrestrial network) in an attempt to prove its claimed false position. As the spot beams' configuration and overlap change with time, a given authorized claimant will log a unique key history. Would-be hackers (i.e., unauthorized claimants) located outside of the authentication region cannot access the authentication keys and/or substantiate their location and, therefore, are denied access to the system. As such, the system may be difficult to spoof or hack because of the sheer number of satellites that are employed, the satellites' low orbits, the rapid motion of the spot beams, and the spot beam configuration of the Iridium satellites. In at least one embodiment, in addition to the spot beam authentication feature, this system leverages geolocation to constrain authentication to within 100 meters (m), typically.

A third aspect of the authentication system is that, when employing one of the above-described Iridium LEO satellites, for example, the transmission signal power is sufficiently strong enough to allow for the signal to penetrate into an indoor environment. This allows for the system to be used for many indoor applications for authentication technologies.

In order to better understand how the authentication systems and methods are able to benefit network security, a brief discussion regarding network security is presented. Network security remains an important infrastructural element as networked electronic systems become more engrained into society and integrated into cyber systems. Such systems are utilized for extensive data processing, for other more general processes through the web, and for other networks whose vulnerability threatens our national infrastructure. Foreign and domestic efforts to infiltrate, compromise, and/or disable key infrastructural elements are increasing and, thus, there is a need to bolster network security in order to protect these systems from these growing threats. Access to these systems by an unauthorized party may have varying degrees of societal impact; and while any given attack may seem to be less significant in nature, it could be the predecessor to a more aggressive future attack. Electronic cyber systems worldwide are seeing dramatic increases in cyber attacks. Cyber attacks often stem from network vulnerabilities, and are often conducted by impersonating a legitimate end user.

Existing methods to detect unauthorized users or compromised electronic systems are lacking, in that, even if an attack is discovered, the culprit's methods may hide the location of where the unauthorized access originated. This issue creates additional problems in that if the attack is believed to have originated in, for instance, a foreign country, the inability to determine the general vicinity of the unauthorized user means that officials may not be able to seek amends or more aggressively pressure foreign countries for conducting investigations of such cyber attacks on the United States.

Current existing identity verification methods are, in general, non-dynamic (e.g., use passwords, pins, etc.), and this leaves these systems more vulnerable to interception and other brute force hacking methods. From a high level, these network security systems have three primary goals: (1) authenticating only authorized users, (2) maintaining system availability and reliability, and (3) restricting access to unauthorized users. Accordingly, it would be advantageous to have improved techniques to restrict access, to authenticate legitimate authorized users, and to maintain system availability and reliability, while at the same time bolster the security of these existing network systems.

In one embodiment at least one authentication signal may be transmitted from at least one Iridium satellite. Each Iridium satellite has forty-eight (48) spot beams that may be used to transmit localized authentication signals to claimants on or near the Earth's surface. The broadcasted message burst content associated with these authentication signals includes pseudorandom noise (PRN) data. Since a given message burst may occur within a specific satellite spot beam at a specific time, the message burst content including PRN and unique beam parameters (e.g., time, satellite identification (ID), time bias, orbit data, etc.) may be used to authenticate the claimant.

As briefly discussed above, a spot beam based authentication system may be inherently vulnerable to spoofing by an unauthorized claimant. Such a claimant can put a receiver device at a location near the authentication signal's intended claimant in order to eavesdrop on the signal transmission. By doing so, an unauthorized claimant can attempt to spoof the specialized authentication signal. This may be accomplished by recording the transmitted authentication data and completing signal processing to develop a signal that has the same bits as the recorded signal and has timing and Doppler characteristics consistent with the location of the intended claimant. By doing this, the authenticator device may think the unauthorized claimant is actually at the same location as the authorized claimant. However, the unauthorized claimant would have to attempt to record the data from an adjacent spot beam, as recording the data within beam zero would be unlikely due to the infrastructural complexity associated with doing so.

With the use of Iridium satellites for transmission, the authentication signal may be a strong signal with a structure that allows it to be received indoors. As such, it may be relatively easy for an unauthorized claimant having an outdoor receiver that is located outside of beam zero to receive the authentication signal if the unauthorized claimant is receiving only signal plus noise (i.e., this occurs in the case when an authentication signal is being transmitted with no guard beams). However, when the satellite is broadcasting different signals in adjacent spot beams, it may be much more difficult for the unauthorized claimant to receive the authentication data that is intended for an authorized claimant at the spoofed location.

In one or more embodiments, in order to mitigate successful spoofing, the authentication systems: (1) transmit an authentication signal via beam zero for the intended legitimate, authorized claimant; and (2) transmit guard signals, which may be on the same frequency as the authentication signal, via guard beams surrounding beam zero and the intended, authorized claimant. As such, the unauthorized claimant's receiver may receive multiple authentication signals including data from beam zero and its guard beams, and may have difficulty processing the data, as it may be difficult to extract a signal out of a signal versus extract a signal out of noise. Additionally, if the unauthorized claimant is able to process at least one of the signals, the signal(s) may be one of the guard signals due to the fact that the received power of the guard beams may be stronger at the unauthorized claimant's receiver location because the guard beams are located closer to the unauthorized claimant. In at least one embodiment, the outside guard beams may have a higher relative power than any of the inner guard beams.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A transmission-based authentication system, the system comprising:
    at least one transmitter, wherein the at least one transmitter transmits an authentication beam and at least one guard beam,
    wherein the at least one transmitter is employed in at least one of at least one satellite and at least one pseudo-satellite, and
    wherein the at least one satellite is at least one of a Lower Earth Orbiting (LEO) satellite, a Medium Earth Orbiting (MEO) satellite, and a Geosynchronous Earth Orbiting (GEO) satellite; and
    at least one receiver, wherein the at least one receiver receives at least one resultant signal, wherein the at least one resultant signal includes the authentication beam and at least one of the at least one guard beam; and
    at least one authenticator device, wherein the at least one authenticator device authenticates at least one claimant by evaluating the at least one resultant signal the at least one claimant receives from the at least one receiver.

2. The system of claim 1, wherein the at least one claimant is at least one of an entity and a user.

3. The system of claim 1, wherein at least one of the at least one receiver and at least one of the at least one transmitter are incorporated together in at least one transceiver.

4. The system of claim 1, wherein the authentication beam and at least one of the at least one guard beam are transmitted from a same transmitter.

5. The system of claim 1, wherein the authentication beam and at least one of the at least one guard beam are transmitted from different transmitters.

6. The system of claim 1, wherein the at least one authenticator device includes at least one of a server and a processor.

7. The system of claim 1, wherein the authentication beam and at least one of the at least one guard beam are transmitted on a same frequency.

8. The system of claim 1, wherein the at least one authenticator device operates at least part of a host network.

9. The system of claim 1, wherein the system further comprises a host network that operates as an intermediary between the at least one claimant and the at least one authenticator device.

10. The system of claim 1, wherein the at least one receiver is employed in at least one of a cell phone, a personal digital assistant (PDA), a personal computer, a computer node, an internet protocol (IP) node, a server, and a wi-fi node.

11. The system of claim 1, wherein the at least one claimant is at least one of stationary and mobile.

12. The system of claim 1, wherein the at least one authenticator device is a peer device.

13. The system of claim 1, wherein the system further comprises a cyber locate portal, wherein the at least one resultant signal is sent to the at least one authenticator device for authentication via the cyber locate portal.

14. A method for a transmission-based authentication system, the method comprising:
    transmitting, from at least one transmission source, a plurality of authentication beams,
    wherein the at least one transmission source is employed in at least one of at least one satellite and at least one pseudo-satellite, and
    wherein the at least one satellite is at least one of a Lower Earth Orbiting (LEO) satellite, a Medium Earth Orbiting (MEO) satellite, and a Geosynchronous Earth Orbiting (GEO) satellite; and
    receiving, from at least one receiving source, at least one resultant signal that includes at least two of the authentication beams; and
    authenticating at least one claimant by comparing properties of the at least one resultant signal the at least one claimant receives from the at least one receiving source location to expected properties of the at least one resultant signal that the at least one claimant should receive from the at least one receiving source location.

15. The method of claim 14, wherein the authentication beams are transmitted from a same transmission source.

16. The method of claim 14, wherein the authentication beams are transmitted from different transmission sources.

17. The method of claim 14, wherein the authentication beams are transmitted on a same frequency and at a same time, and
    wherein each authentication beam has a different modulation than the other authentication beams.

18. The method of claim 17, wherein the different modulations are different pseudorandom digital modulation sequences.

19. The method of claim 18, wherein the different pseudorandom digital modulation sequences are different BPSK code sequences.

20. The method of claim 14, wherein the properties are at least one of signal power, doppler shift, time of reception, and signal modulation.

* * * * *